US007689251B2

(12) United States Patent  (10) Patent No.: US 7,689,251 B2
Bae  (45) Date of Patent: Mar. 30, 2010

(54) APPARATUS AND METHOD FOR CONTROLLING USE OF A SIM CARD OF A MOBILE TERMINAL

(75) Inventor: Min-Ho Bae, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 957 days.

(21) Appl. No.: 10/976,591

(22) Filed: Oct. 29, 2004

(65) Prior Publication Data

US 2005/0096088 A1 May 5, 2005

(30) Foreign Application Priority Data

Oct. 31, 2003 (KR) .................. 10-2003-0076959

(51) Int. Cl.
H04B 1/38 (2006.01)
(52) U.S. Cl. .................................. 455/558; 455/550.1
(58) Field of Classification Search ................ 455/558
See application file for complete search history.

(56) References Cited

U.S. PATENT DOCUMENTS

| 6,138,002 | A * | 10/2000 | Alperovich et al. | 455/407 |
| 2004/0005911 | A1* | 1/2004 | Guirauton et al. | 455/558 |
| 2004/0029570 | A1* | 2/2004 | Knorr et al. | 455/414.1 |
| 2004/0087345 | A1* | 5/2004 | Girard | 455/562.1 |
| 2004/0137893 | A1* | 7/2004 | Muthuswamy et al. | 455/419 |
| 2005/0020308 | A1* | 1/2005 | Lai | 455/558 |
| 2005/0102374 | A1* | 5/2005 | Moragne et al. | 709/217 |
| 2005/0212690 | A1* | 9/2005 | Nishikawa | 340/932.2 |

FOREIGN PATENT DOCUMENTS

| CN | 1407787 | 4/2003 |
| JP | 2000-184087 | 6/2000 |
| JP | 2000-306066 | 11/2000 |
| JP | 2000-308140 | 11/2000 |
| JP | 2002-086808 | 3/2002 |
| JP | 2002-163584 | 6/2002 |
| JP | 2002-236901 | 8/2002 |

(Continued)

Primary Examiner—Yuwen Pan
Assistant Examiner—Ankur Jain
(74) Attorney, Agent, or Firm—Lee, Hong, Degerman, Kang & Waimey

(57) ABSTRACT

An apparatus and a method for controlling the use of a SIM card mounted in a mobile terminal by employing a fraud technology includes comparing data related to the SIM card received from a network to information read from the SIM card in the terminal as part of a terminal initialization process and generating a control signal to cause an RF antenna switch to open or close an RF antenna loop structure in order to disable or enable a requested SIM card function. The data received form the network and the information read from the SIM card in the terminal include subscriber information and transportation card information that allow a determination of whether a user requesting a SIM card function is the subscriber entitled to access the function. If the data received form the network and the information read from the SIM card are identical, the requested SIM card function is approved. If the data received from the network and the information read form the SIM card are not identical, the requested SIM card function is not approved. Optional password protection of SIM card functions may also be provided.

10 Claims, 2 Drawing Sheets

FOREIGN PATENT DOCUMENTS

| | | |
|---|---|---|
| JP | 2002259869 | 9/2002 |
| JP | 2003-150993 | 5/2003 |
| JP | 2002-529032 | 9/2003 |
| WO | WO9949424 | 9/1999 |
| WO | WO0237363 | 5/2002 |

\* cited by examiner

APPARATUS AND METHOD FOR CONTROLLING USE OF A SIM CARD OF A MOBILE TERMINAL

CROSS-REFERENCE TO RELATED APPLICATIONS

Pursuant to 35 U.S.C. § 119(a), this application claims the benefit of earlier filing date and right of priority to Korean Application No. 76959/2003, filed on Oct. 31, 2003, the contents of which is hereby incorporated by reference herein in their entirety:

BACKGROUND OF THE INVENTION

1. Field of the Invention

The present invention relates to a mobile terminal, and specifically to an apparatus and a method for controlling the use of a SIM card mounted in a mobile terminal.

2. Description of the Related Art

A Subscriber Identification Module (SIM) card is a small card which is inserted in a slot formed at the back of a mobile terminal. A SIM card may be a "smart card" which is capable of storing information and performing a process or operation in conjunction with a microprocessor and memory included in the mobile terminal.

A SIM card containing subscriber information allows the subscriber to use any mobile terminal into which the SIM card is inserted, thereby allowing the subscriber to use the mobile terminal as if it belongs to the subscriber. A SIM card may also be utilized in an electronic commerce since a SIM card provides excellent security. SIM cards having post payment-type transportation card functions are used, for example to allow a subscriber to utilize public transportation without having to use coins or bills.

FIG. 1 illustrates a conventional mobile terminal 1 in which a SIM card 10 is mounted. The mobile terminal 1 includes a SIM card 10 and an RF antenna 20 connected to terminals 12, 14 of the SIM card in a loop structure. As illustrated in FIG. 1, the mobile terminal 1 cannot directly control the SIM card 10 since the SIM card and the RF antenna 20 are directly connected. Therefore, if the SIM card is lost or stolen, there is no way to prevent the SIM card from being used by someone other than the subscriber and the subscriber may sustain a financial loss if, for example, the SIM card has payment-type transportation card functions. Furthermore, use of counterfeit SIM cards may not be prevented.

Therefore, there is a need for a mobile terminal which can control the use of a SIM card mounted therein in order to, for example, prevent a counterfeit, lost or stolen SIM card from being used. The present invention addresses these and other needs.

SUMMARY OF THE INVENTION

The present invention is directed to an apparatus and method for controlling the use of a SIM card mounted in a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile terminal that allows the use of a SIM card mounted therein to be controlled such that unauthorized use of the SIM card may be prevented. Specifically, the terminal receives data related to the SIM card from a network and compares the data received from the network to information read from the SIM card, with a requested SIM card function processed only if the data received from the network is identical to the information read from the SIM card and, optionally, the user is requested to enter a password which is compared to a preset password, with the requested SIM card function processed only if the entered password is identical to the preset password. Although the invention is described herein with regard to a mobile communication device, it is contemplated that the present invention may be utilized anytime it is desired to control use of a SIM card that is part of a mobile terminal.

In one aspect of the present invention, an apparatus is provided for controlling the use of a subscriber identification module (SIM) card of a mobile terminal. The apparatus includes a SIM card mounted in the terminal, an RF antenna connected to terminals of the SIM card in a loop structure, a terminal control unit for performing an initialization process to receive data related to the SIM card from a network, read information from the SIM card and generate a control signal according to a comparison of the received data and read information, and an RF antenna switch for opening or closing the RF antenna loop structure according to the control signal generated by the terminal control unit.

The SIM card may be of any type known in the art that has functions accessible by a user. In a preferred embodiment, the SIM card includes a payment function such as a pre payment-type or post payment-type transportation card function that allows a user to pay the fare for public transportation.

The network includes a base station with which the mobile terminal communicates via the RF antenna in order to receive data related to the SIM card. In a preferred embodiment, the base station is connected to a transportation institution system and a financial institution system to enable a user to access a transportation card function of the SIM card.

It is contemplated that the terminal control unit may perform the initialization process as part of a power-up initialization or whenever a user requests a SIM card function. The data received from the network and information read from the SIM card may include subscriber information, such as a subscriber's name, a subscriber identification number and/or a data of subscription, and transportation card information, such as a specific transportation card number.

The control signal generated by the terminal control unit controls the RF antenna switch in order to either enable a SIM card function or disable a SIM card function. In a preferred embodiment, the control signal disables a SIM card function by causing the RF antennal switch to open the RF antenna loop structure if the data received from the network is not identical to the information read from the SIM card and enables a SIM card function by causing the RF antennal switch to close the RF antenna loop structure if the data received from the network is identical to the information read from the SIM card. The terminal control unit may provide additional SIM card security even when the received data and read information are identical by requesting a user to enter a password which is compared to a preset password and enabling the requested SIM card function only if the entered password matches the preset password.

In another aspect of the present invention, a method is provided for controlling the use of a SIM card of a mobile terminal. The method includes initializing the terminal, receiving data related to the SIM card from a network, reading information from the SIM card, comparing the received data to the data read from the SIM card and controlling use of the SIM card according to the comparison result.

The SIM card may be of any type known in the art that has functions accessible by a user. In a preferred embodiment, the SIM card includes a payment function such as a pre payment-type or post payment-type transportation card function that allows a user to pay the fare for public transportation.

It is contemplated that the method may be performed as part of a power-up initialization process or whenever a user requests a SIM card function. The data received from the network and information read from the SIM card may include subscriber information, such as a subscriber's name, a subscriber identification number or a data of subscription, or transportation card information, such as a specific transportation card number. In a preferred embodiment, the information related to the SIM card is not received from the network if the SIM card has been reported lost or stolen by the subscriber.

The data received from the network is compared to the information read from the SIM card in order to determine if the user of the SIM card is the subscriber to whom the SIM card belongs. In a preferred embodiment, the comparison is performed to determine that subscriber data received from the network is identical to subscriber information read from the SIM card and that transportation card data received from the network is identical to transportation card information read from the SIM card.

Based on the comparison of the data received from the network and the information read from the SIM card, a requested function of the SIM card is either enabled or disabled. Additionally, the method may provide "password protection" for SIM card functions even when the received data and read information are identical by requesting a user to enter a password which is compared to a preset password and enabling the requested SIM card function only if the entered password matches the preset password.

By controlling use of the SIM card based on data received from the network, use of a lost, stolen or counterfeit SIM card may be prevented. For example, fraudulent use of a SIM card may be prevented by checking a SIM card for which a function, such as a transportation card function, is requested against a list of lost and stolen SIM cards and disabling the requested function if the SIM card has been reported lost or stolen by the subscriber. Furthermore, use of a counterfeit SIM card may be prevented by comparing the SIM card data received from the network to the information read from the SIM card and disabling the requested function if the received data is not identical to the information read from the card. Moreover, password protection provides additional security against unauthorized use of a SIM card.

The foregoing and other objects, features, aspects and advantages of the present invention will become more apparent from the following detailed description of the present invention when taken in conjunction with the accompanying drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to apparatus and a method for controlling the use of a SIM card mounted in a mobile terminal. Although the present invention is illustrated with respect to a mobile communication device, it is contemplated that the present invention may be utilized anytime it is desired to control a SIM card that is part of a mobile terminal.

Reference will now be made in detail to the preferred embodiments of the present invention, examples of which are illustrated in the accompanying drawings. In describing the present invention, if a detailed explanation for a related known function or construction is unnecessary, such explanation has been omitted but would be understood by those skilled in the art.

Figure 1:
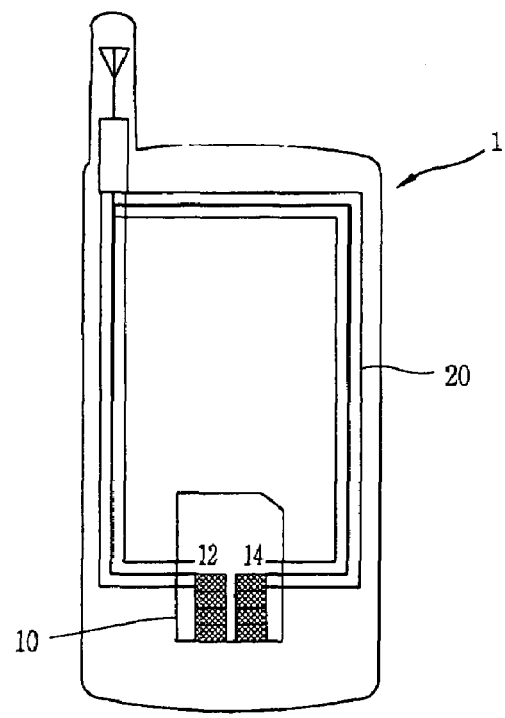
FIG. 1 is a view illustrating a conventional structure of a mobile terminal in which a SIM card is mounted.
Figure 2:
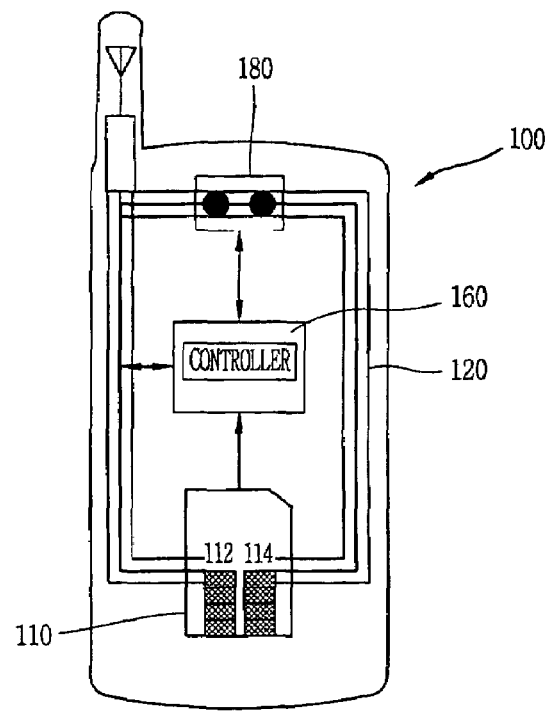
FIG. 2 is a view illustrating a structure of an apparatus for controlling the use of a SIM card of a mobile terminal in accordance with one embodiment of the present invention.

FIG. 2 illustrates an apparatus for controlling the use of a SIM card of a mobile terminal in accordance with one embodiment of the present invention. The apparatus 100 is a mobile communication device that includes a SIM card 110, an RF antenna 120 connected to two terminals 112, 114 of the SIM card in a loop structure, a terminal control unit 160 and an RF antenna switch 180 for opening or closing the loop structure of the RF antenna 120.

It is contemplated that the SIM card may be of any type known in the art and may include any function typically associated with a SIM card. In a preferred embodiment, the SIM card has a payment function, for example a pre or post payment-type transportation card function that enables a subscriber to utilize public transportation and pay with the SIM card.

The terminal control unit 160 is adapted to perform a terminal initialization process to receive data related to the SIM card from a network (not shown) and read information from the SIM card in order to generate a control signal that is utilized by the RF antenna switch 180 to control use of the SIM card. The data received from the network and information read from the SIM card may include subscriber information allowing identification of the subscriber of a particular SIM card function and information related to a particular SIM card function such as a transportation card function. In a preferred embodiment, the subscriber information includes a subscriber's name, a subscriber's identification number and/or a date of subscription to a particular SIM card function and the transportation card information includes a transportation card number.

The network may include a base station with which the terminal control unit communicates via the RF antenna 120. In a preferred embodiment, the base station also communicates with a transportation institution system, such as a bus or subway system, and a financial institution system, such as a bank, in order to allow a subscriber to use the transportation system by paying a fare with a SIM card having a pre or post payment-type transportation card function.

The RF antenna switch 180 is adapted to open or close the loop structure of the RF antenna 120 according to the control signal from the terminal control unit 160. When the loop structure of the RF antenna 120 is closed, the SIM card is enabled for use. When the loop structure of the RF antenna 120 is open, the SIM card is disabled from use.

If all the data received from the network is identical to the information read from the SIM card, a comparison result that indicates that the user is the subscriber, a control signal is generated to cause the RF antenna switch 180 to close the loop structure of the RF antenna 120, thereby enabling use of the SIM card. If there is any difference between the data received from the network and the information read from the SIM card, a comparison result that indicates that the user is not the subscriber, a control signal is generated to cause the RF antenna switch 180 to open the loop structure of the RF antenna 120, thereby disabling use of the SIM card. In this manner, unauthorized use of a SIM card may be prevented.

In one contemplated use, when a SIM card user requests a mobile communication provider to enable a transportation card function, the mobile communication provider transmits newly-issued transportation card data and subscriber data from a network to a SIM card in the user's mobile communication terminal and the SIM card stores the transmitted data as transportation card information and subscriber information. As part of a subsequent terminal initialization process, the terminal control unit 160 compares transportation card data and subscriber data received from the network with transportation card information and subscriber information read from the SIM card 110 and generates a control signal according to the comparison result.

The subsequent terminal initialization process of receiving and comparing data from the network to information read from the SIM card and generating a control signal may be performed upon power-up of the mobile communication device or when the user of the device attempts to utilize a SIM card function. If a counterfeit SIM card is used or the SIM card has been altered, the data received from the network may no longer match the information stored in the SIM card and a requested function of the SIM card may be disabled as a result of the comparison.

Figure 3:
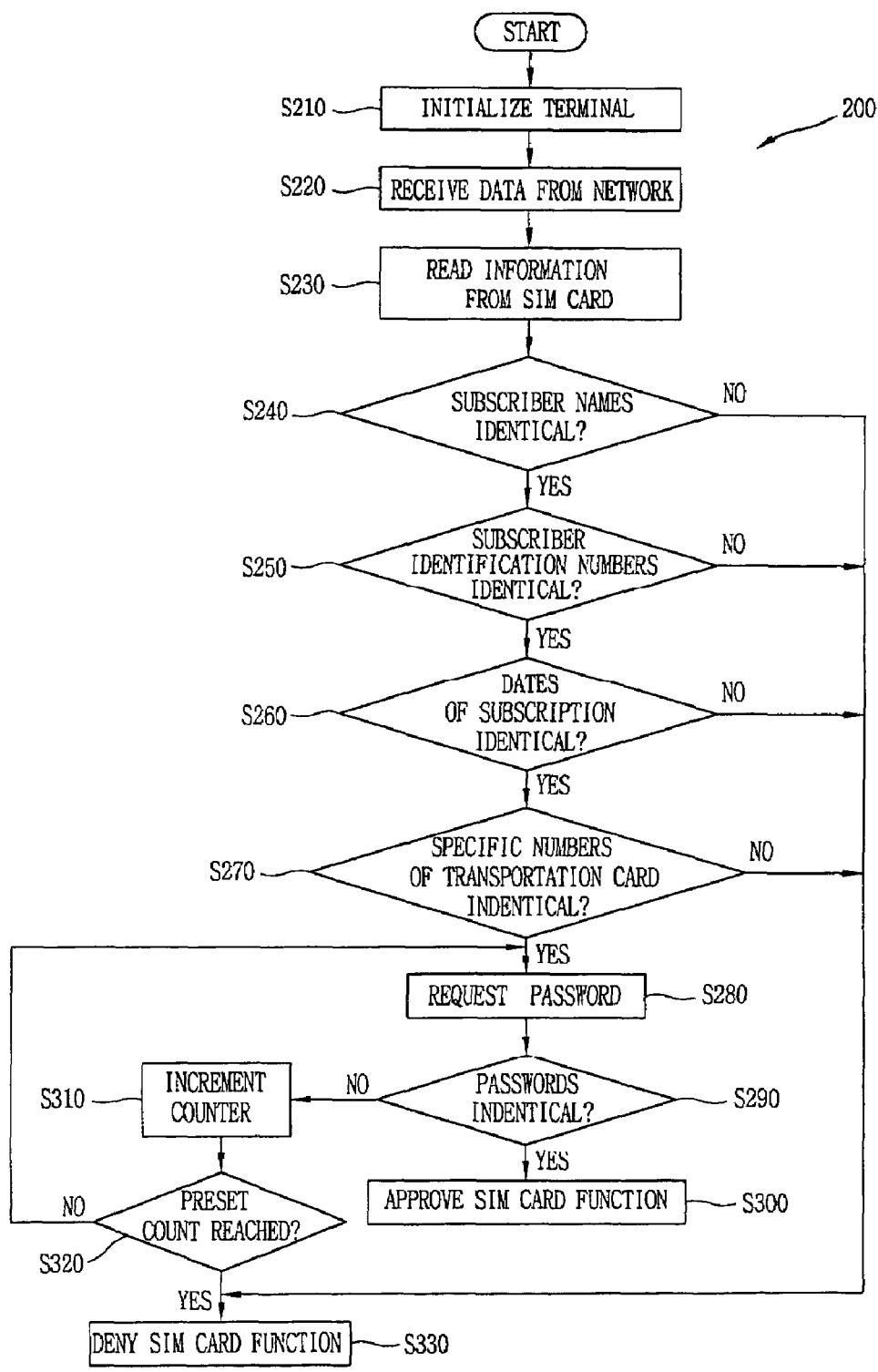
FIG. 3 is a flow chart illustrating a method for controlling the use of a SIM card of a mobile terminal in accordance with one embodiment of the present invention.

FIG. 3 illustrates a flow chart of a method for controlling the use of a SIM card of a mobile terminal in accordance with one embodiment of the present invention. The method 200 includes initializing the terminal (S210), receiving data related to the SIM card from the network (S220), reading information from the SIM card (S230), comparing the data received from the network to the information read from the SIM card (S240 to S270) and controlling the use of the SIM card according to the comparison result by approving the requested SIM card function (S300) if all the data received from the network is identical to the information read from the SIM card, or, optionally, requesting a password from the user (S280), comparing the password input to a preset password in the terminal (S290) and either approving the requested SIM card function (S300) or denying the requested SIM card function (S330).

As illustrated in FIG. 3, the terminal is initialized and synchronized with a network in step S210, for example by transmitting and receiving signals to and from a base station. The base station may be connected to systems of a transportation operation institution and a financial institution, for example if the SIM card has a pre or post payment-type transportation card function, so as to transmit data such as transportation card information and subscriber information to the terminal. In the preferred embodiment illustrated in FIG. 3, the transportation card information is a specific number of a transportation card assigned when the transportation card is issued and the subscriber information includes a subscriber's name, a subscriber identification number and a date of subscription.

Additionally, the initialization step S210 may include the network checking the SIM card identification against a list of SIM cards reported lost or stolen by subscribers. If the SIM card is identified as lost or stolen, the network does not transmit the corresponding transportation card information. Accordingly, if a user attempts to use a lost or stolen SIM card to pay a transportation fare, the function will be disabled.

The terminal receives the data from the network in step S220 and reads similar information from the SIM card of the terminal in step S230. Thereafter, the terminal compares the received data with the information read from the SIM card in steps S240 to S270.

The comparisons performed may vary based on the function of the SIM card that the user is attempting to access. As illustrated in FIG. 3 for a SIM card having a pre or post payment-type transportation card function, comparisons are made of the subscriber's name in step S240, a subscriber identification number in step S250, the date of subscription in step S260, and the specific transportation card number in step S270.

First, the subscriber's name received from the network is compared with the subscriber's name read from the SIM card in step S240. If the names are not identical, the requested SIM card function is denied in step S330.

If the subscriber's name received from the network is identical to the subscriber's name read from the SIM card, subscriber identification numbers are compared in step S250. If the identification numbers are not identical, the requested SIM card function is denied in step S330.

If the subscriber identification number received from the network is identical to the subscriber identification number read from the SIM card, subscriber dates of subscription are compared in step S260. If the subscriber dates of subscription are not identical, the requested SIM card function is denied in step S330.

If the subscriber date of subscription received from the network is identical to the subscriber date of subscription read from the SIM card, specific transportation card numbers are compared in step S270. If the specific numbers of the transportation card are not identical, the requested SIM card function is denied in step S330.

If any of the comparisons in steps S240 to step S270 are unsuccessful, the requested use of the SIM card is denied in step S330, for example by causing the RF antenna switch 180 to open the loop structure of the RF antenna 120, thereby disabling use of the SIM card to prevent a user from paying a transportation fare. If all the comparisons in steps S240 to step S270 are successful, the requested SIM card function may be approved in step S300, for example by causing the RF antenna switch 180 to close the loop structure of the RF antenna 120, thereby enabling use of the SIM card to allow a user to pay a transportation fare. Optionally, an additional level of security may be provided by requiring the user to enter a password.

If the SIM card use is password protected, the user is requested to input a password in step S280. The password input by the user is compared with a password which has been previously set and stored in step S290. If the entered password and stored password are identical, the requested SIM card function is approved in step S300.

If the entered password and stored password are not identical, the user may be given an opportunity to input the password again in order to allow for human error in inputting the password. The number of additional opportunities the user is given to input the correct password may be any number preset in the terminal.

A counter is incremented in step S310 and the incremented count is compared to a preset limit in step S320. If the preset count has not been reached, the user is again requested to input a password in step S280. If the user fails to input the correct password before the preset count is reached, the requested SIM card function is denied in step S330. If the user successfully inputs the correct password before the preset count is reached, the requested SIM card function is approved in step S300.

As described, the apparatus and the method for controlling a SIM card of a mobile terminal in accordance with the present invention can prevent a lost mobile terminal or SIM card from being used fraudulently, by receiving subscriber data and transportation card data from a network, comparing the received data with subscriber information and transportation card information read from a SIM card in the terminal and controlling the terminal according to the comparison result. By preventing fraudulent use of a SIM card, a financial loss of the subscriber may be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for controlling the use of a subscriber identification module (SIM) card of a mobile terminal, the apparatus comprising:
   a SIM card mounted in the terminal, wherein the SIM card stores subscriber identification information comprising a subscriber name and a subscriber identification number;
   a radio frequency (RF) antenna connected to at least two terminals of the SIM card in a loop structure;
   a terminal control unit configured to perform an initialization process comprising receiving data related to the SIM card from a network, reading the subscriber identification information from the SIM card and generating a control signal according to whether the received data is identical to the subscriber information stored on the SIM card; and
   an RF antenna switch operatively coupled with the terminal control unit, the SIM card, and the RF antenna to enable using the SIM card according to the control signal generated by the terminal control unit and disable using the SIM card according to the control signal generated by the terminal control unit while the SIM card is mounted in the terminal and the terminal is turned on,
   wherein the data related to the SIM card is not received from the network if a subscriber has reported the SIM card as one of lost or stolen,
   wherein the control signal is generated according to a result of a comparison of the data received from the network to the information read from the SIM card,
   wherein the RF antenna switch connects the SIM card to the RF antenna when the data received from the network is identical to the information read from the SIM card,
   wherein the RF antenna switch disconnects the SIM card from the RF antenna when the data received from the network is not identical to the information read from the SIM card while the SIM card is mounted in the terminal and the terminal is turned on,
   wherein using the SIM card is enabled when the SIM card is connected to the RF antenna and is disabled when the SIM card is disconnected from the RF antenna while the SIM card is mounted in the terminal and the terminal is turned on.

2. The apparatus of claim 1, wherein the SIM card comprises a payment function.

3. The apparatus of claim 2, wherein the payment function is one of a post payment-type transportation card function and a pre payment-type transportation card function.

4. The apparatus of claim 1, wherein the network comprises a base station connected to at least a transportation institution system and a financial institution system.

5. The apparatus of claim 1, wherein the data received from the network and the information stored on the SIM card comprise transportation card information.

6. The apparatus of claim 5, wherein the subscriber information comprises a date of subscription of the transportation card information.

7. The apparatus of claim 5, wherein the transportation card information comprises a specific number of a transportation card.

8. The apparatus of claim 1, wherein the terminal control unit is adapted to perform the initialization process upon power-up of the mobile terminal.

9. The apparatus of claim 1, wherein the terminal control unit is adapted to perform the initialization process whenever a user requests a SIM card function.

10. The apparatus of claim 1, the terminal control unit further adapted to perform the initialization process by receiving a password input by a user and comparing the input password to a preset password in order to generate the control signal and wherein the RE antenna loop structure is closed if the input password is identical to the preset password and the RF antenna loop structure is open if the input password is not identical to the preset password.

* * * * *